United States Patent
Kim

(10) Patent No.: US 9,350,004 B2
(45) Date of Patent: May 24, 2016

(54) CYLINDRICAL SECONDARY BATTERY

(75) Inventor: Daekyu Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1077 days.

(21) Appl. No.: 12/348,394

(22) Filed: Jan. 5, 2009

(65) Prior Publication Data

US 2009/0233160 A1 Sep. 17, 2009

(30) Foreign Application Priority Data

Mar. 13, 2008 (KR) ................................ 2008-23384

(51) Int. Cl.
| | |
|---|---|
| H01M 4/00 | (2006.01) |
| H01M 2/14 | (2006.01) |
| H01M 2/00 | (2006.01) |
| H01M 2/08 | (2006.01) |
| H01M 2/12 | (2006.01) |
| H01M 2/02 | (2006.01) |
| H01M 2/04 | (2006.01) |
| H01M 2/22 | (2006.01) |

(52) U.S. Cl.
CPC ............ *H01M 2/1205* (2013.01); *H01M 2/023* (2013.01); *H01M 2/0413* (2013.01); *H01M 2/22* (2013.01); *H01M 2200/00* (2013.01)

(58) Field of Classification Search
CPC .......... H01M 2/00; H01M 2/10; H01M 2/18; H01M 10/04; H01M 2/1205
USPC .......................................... 429/129, 130, 246
IPC ............................ H01M 2/00, 2/10, 2/18, 10/04
See application file for complete search history.

(56) References Cited

U.S. PATENT DOCUMENTS

| | | | |
|---|---|---|---|
| 6,743,546 B1 * | 6/2004 | Kaneda et al. ................ 429/127 |
| 2001/0012582 A1 * | 8/2001 | Kim .............................. 429/184 |
| 2003/0215700 A1 * | 11/2003 | Hosoda et al. .................. 429/94 |
| 2006/0121341 A1 | 6/2006 | Hosoda et al. |
| 2006/0263676 A1 * | 11/2006 | Chang et al. ..................... 429/74 |
| 2006/0275665 A1 * | 12/2006 | Hyung et al. .................. 429/223 |
| 2008/0268336 A1 * | 10/2008 | Jeon .............................. 429/182 |

FOREIGN PATENT DOCUMENTS

| | | |
|---|---|---|
| JP | 2001-210384 | 8/2001 |
| JP | 2003-308873 | 10/2003 |
| KR | 10-0522819 | 10/2005 |

(Continued)

OTHER PUBLICATIONS

English-language abstract of KR 10-2005-0019359.

(Continued)

*Primary Examiner* — Daniel Gatewood
(74) *Attorney, Agent, or Firm* — Knobbe, Martens, Olson & Bear, LLP

(57) ABSTRACT

A cylindrical secondary battery including: an electrode assembly including first and second electrode tabs; a can to house the electrode assembly; a cap assembly to seal an opening of the can; and an integrated assembly including a gasket, an insulation plate, and a central pin. An outer edge of the gasket is bent by the can, around an outer edge of the cap assembly. The insulation plate extends from the gasket, to cover a surface of the electrode assembly. The central pin extends from the center of the insulation plate, into the electrode assembly.

18 Claims, 6 Drawing Sheets

(56) References Cited

FOREIGN PATENT DOCUMENTS

| KR | 10-0563034 | | 3/2006 |
|---|---|---|---|
| KR | 10-0599710 | | 7/2006 |
| KR | 10-2006-0103027 | | 9/2006 |
| KR | 10-0686801 | | 2/2007 |
| KR | 10-2007-004 13 70 | * | 3/2007 |
| KR | 10-2007-0041370 | * | 3/2007 |
| KR | 10-2007-0071246 | | 7/2007 |

OTHER PUBLICATIONS

English-language abstract of KR 10-2000-0066867.
English-language abstract of KR 10-2006-0010484.
English-language abstract of KR 10-2007-0006244.
KR 10-0522819 (AD) is the patent of and is substantially equivalent to KR 10-2005-0019359 (AH), of which the English-language Abstract is submitted.
KR 10-0563034 (AE) is the patent of and is substantially equivalent to KR 10-2000-0066867 (AI), of which the English-language Abstract is submitted.
KR 10-0599710 (AF) is the patent of and is substantially equivalent to KR 10-2006-0010484 (AJ), of which the English-language Abstract is submitted.
KR 10-0686801 (AG) is the patent of and is substantially equivalent to KR 10-2007-0006244 (AK), of which the English-language Abstract is submitted.

* cited by examiner

CYLINDRICAL SECONDARY BATTERY

CROSS-REFERENCE TO RELATED APPLICATION

This application claims the benefit of Korean Application No. 2008-23384, filed Mar. 13, 2008, in the Korean Intellectual Property Office, the disclosure of which is incorporated herein by reference.

BACKGROUND OF THE INVENTION

1. Field of the Invention

Aspects of the present invention relate to a cylindrical secondary battery, and more particularly, to a cylindrical secondary battery that can prevent an increase of internal resistance, by preventing the movement of an electrode assembly.

2. Description of the Related Art

Generally, a cylindrical secondary battery includes a cylindrical electrode assembly, a cylindrical can to house the electrode assembly and an electrolyte, and a cap assembly to seal an upper opening of the can, and to allow current generated in the electrode assembly to flow to the outside.

The electrode assembly is formed by arranging a separator between a cathode plate and an anode plate, and winding the same into a jellyroll-type shape. A cylindrical center pin is inserted into the middle of the electrode assembly. In other words, the center pin is inserted into a space that is formed by removing a shaft that is used to wind the electrode assembly. The center pin prevents deformations of the electrode assembly, and discharges gas generated in the battery, to an upper part of the battery. In addition, upper and lower insulation plates are provided at upper and lower parts of the electrode assembly. The upper and lower insulation plates prevent a short between the electrode assembly and the cap assembly, or between the electrode assembly and the cylindrical can.

The electrode assembly is received in the cylindrical can, and then a beading part is formed on an upper portion of the can, to prevent the electrode assembly from moving in the can. In addition, a gasket is provided inside the upper opening of the can, to secure various battery components, and to seal the can. The cap assembly is disposed inside the gasket, to finish the upper opening of the can. Then, the can is crimped at the upper opening, to combine a cap-up of the cap assembly with the gasket. Finally, the battery is covered with an outer case, thereby completing the cylindrical secondary battery.

The manufacturing cost of each component may be increased, as the gasket, the center pin, and the insulation plate are formed in independent processes. Accordingly, the entire manufacturing process of the cylindrical secondary battery becomes complicated, and manufacturing time is increased. When an impact, such as a drop, is applied to the battery, the center pin may be separated from the electrode assembly, and may damage the cap assembly. In addition, when the cylindrical secondary battery is used as a power supply of an electric tool, the internal electrode assembly may be severely vibrated, by vibrations of the electric tool. The vibrations may increase the internal resistance (IR) of the battery, and cause problems, such as fires and explosions.

SUMMARY OF THE INVENTION

An aspect of the present invention provides a cylindrical secondary battery that can prevent increases in an internal resistance thereof, by preventing movements of an electrode assembly.

According to aspects of the present invention, there is provided a cylindrical secondary battery, which comprises: an electrode assembly including first and second electrode plates and a separator, which are wound into a jellyroll-type shape. The electrode assembly includes a central hole, and first and second electrode tabs extending from the first and second electrode plates. The secondary battery further includes: a can to house the electrode assembly; a cap assembly to seal an upper opening of the can; and an integrated assembly including a gasket, an insulation plate, and a central pin. An outer part of the gasket is combined with the can, and an inner part of the gasket surrounds an outer perimeter of the cap assembly. The insulation plate extends from the gasket, and covers an upper surface of the electrode assembly. The central pin extends from the center of the insulation plate, and is inserted into the central hole of the electrode assembly.

According to aspects of the present invention, the central pin may be moved toward the cap assembly, so as to incline the insulation plate with respect to the electrode assembly, when the integrated assembly is compressed by the can.

According to aspects of the present invention, the central pin may contact the cap assembly, to support the cap assembly, and the insulation plate may contact an upper part of the electrode assembly, when the integrated assembly is compressed by the can. The length of a portion of the integrated assembly can be compressed by 40 to 50%.

According to aspects of the present invention, the gasket may have a bent part that is bent around an edge of the cap assembly, and a connection part that extends from the bent part, and is bent away from the cap assembly, so as to support the cap assembly.

According to aspects of the present invention, the insulation plate may be circular, and may have a main hole connected to the central pin, and a plurality of sub-holes formed around the main hole. The first electrode tab passes through one of the sub-holes. The central pin may be hollow and have side wall holes.

According to aspects of the present invention, the gasket may be thicker than the insulation plate and the central pin.

According to aspects of the present invention, the integrated assembly may be made of a resin material, such as plastic, or polypropylene.

According to aspects of the present invention, the integrated assembly may be formed by injection molding.

According to aspects of the present invention, the cap assembly may include a cap up, a safety vent disposed on an inner surface of the cap up, an insulator disposed on an inner surface of the safety vent, a cap down disposed on an inner surface of the insulator, and a sub-plate disposed on an inner surface of the cap down.

According to aspects of the present invention, the cap up may be a circular plate having a central projection that extends away from the electrode assembly, and having an outer edge located inside of the bent part.

According to aspects of the present invention, the safety vent may be a circular plate having a central projection that extends toward the electrode assembly, and having an outer edge disposed inside of the bent part.

According to aspects of the present invention, the cap down may be a circular plate having a central through-hole, in which the projected part of the safety vent is disposed, and having an outer edge that is located inside the connection part.

Additional aspects and/or advantages of the invention will be set forth, in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EMBODIMENTS

Figure 1:
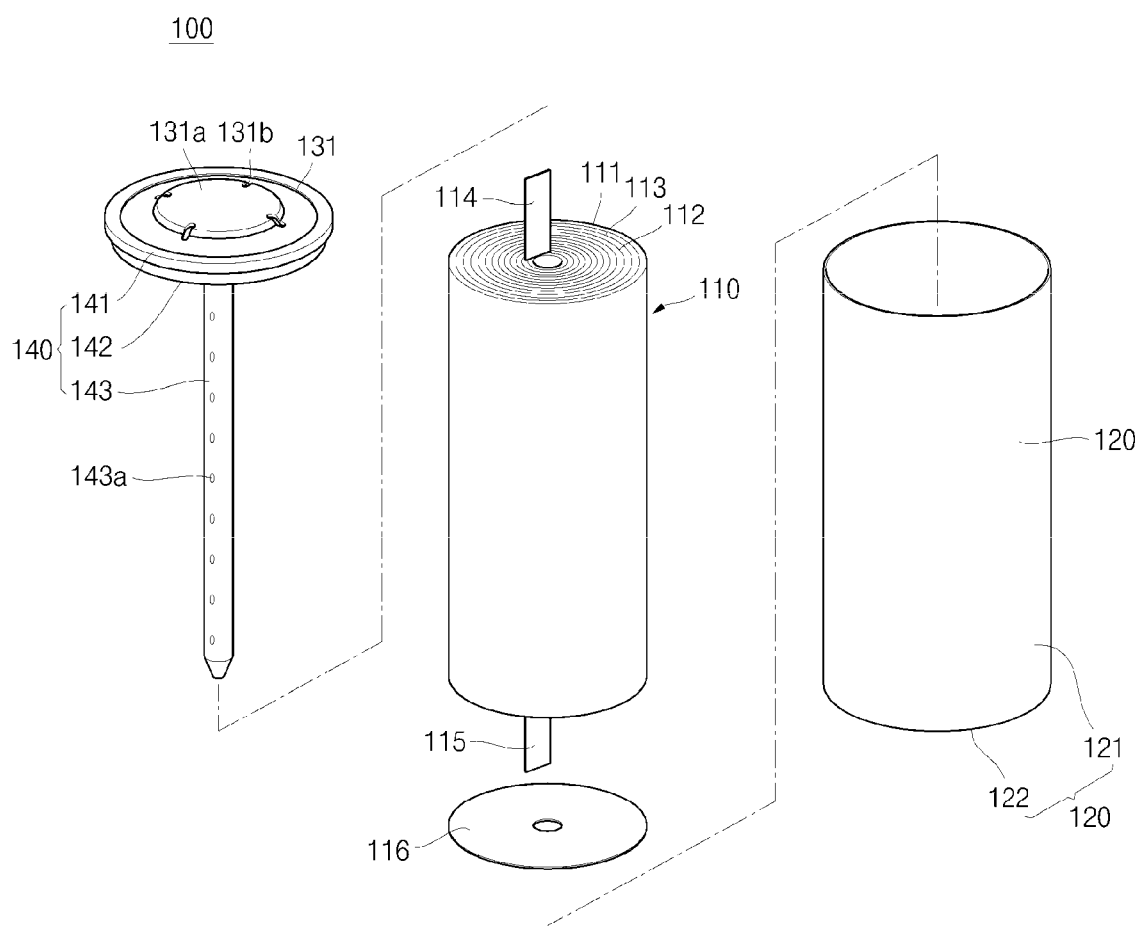
FIG. 1 is an exploded perspective view illustrating a cylindrical secondary battery, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 2:
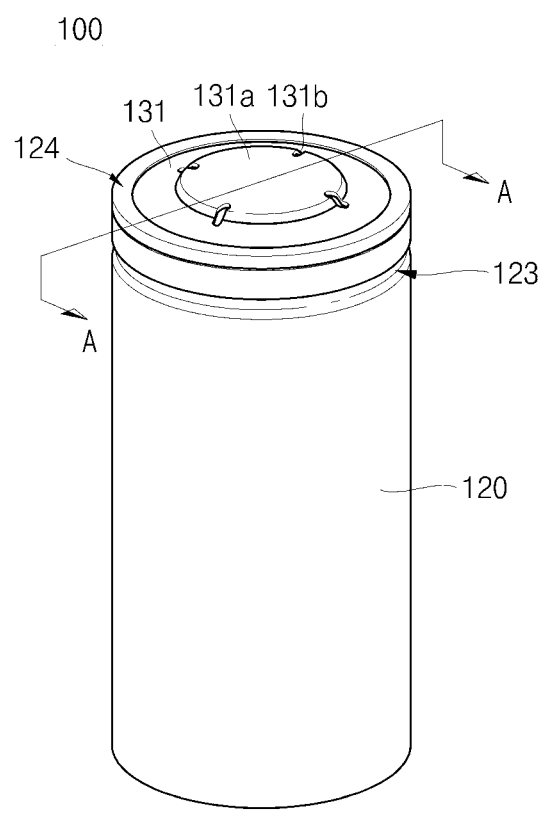
FIG. 2 is a perspective of the cylindrical secondary battery of FIG. 1.
Figure 3:
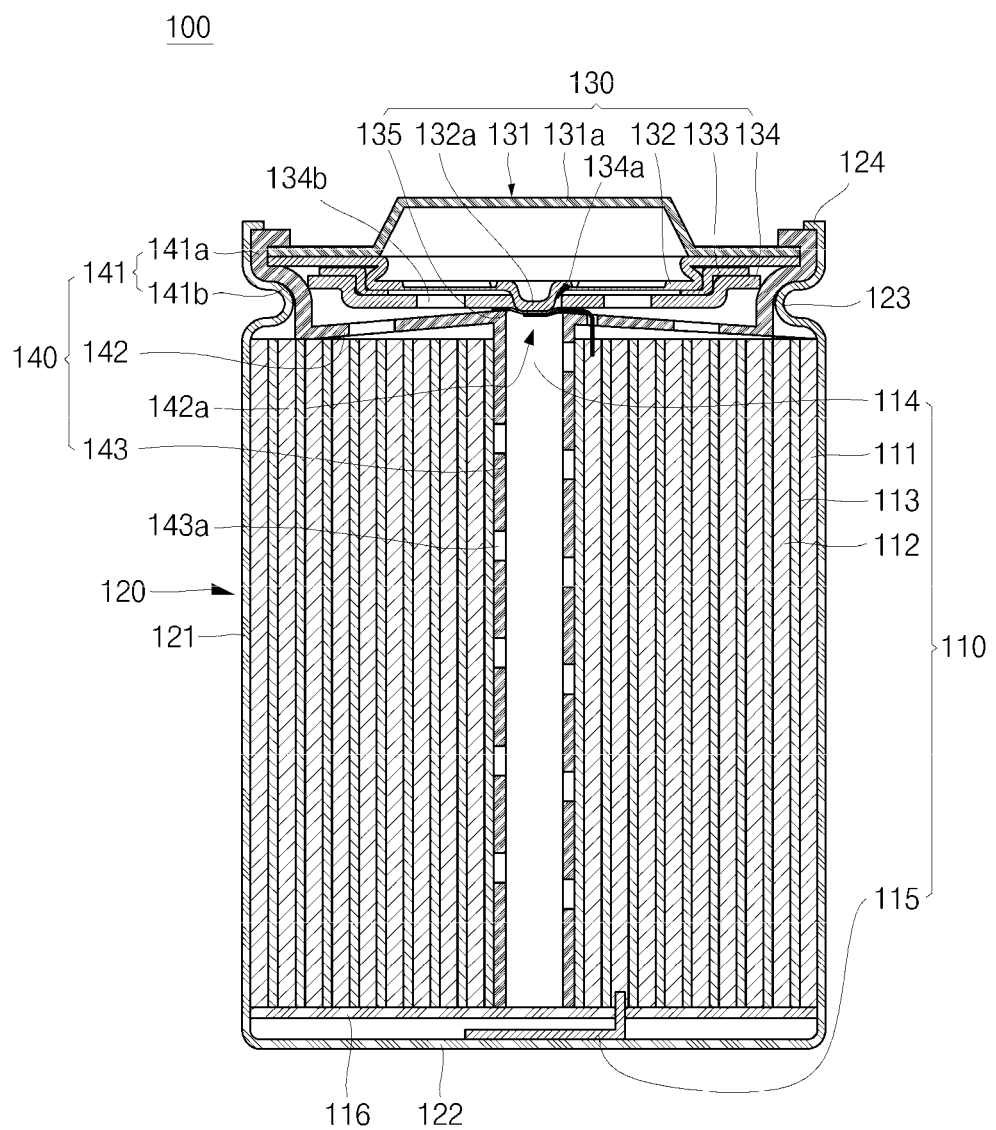
FIG. 3 is a sectional view taken along 'A-A' line of FIG. 2.
Figure 4:
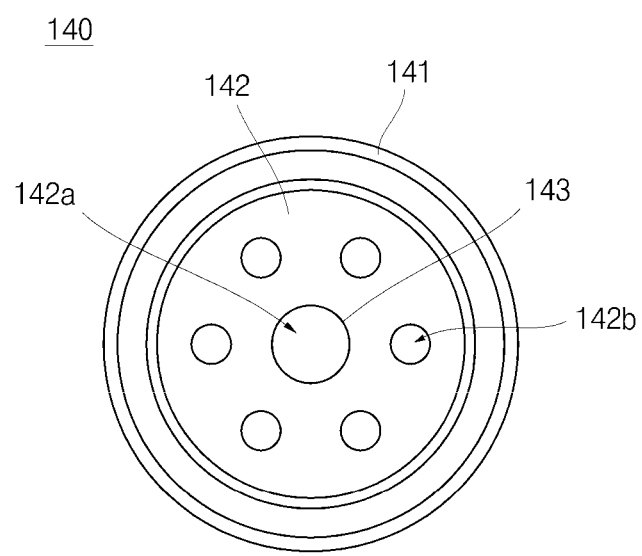
FIG. 4 is a top plan view illustrating an integrated assembly of FIG. 3.
Figure 5:
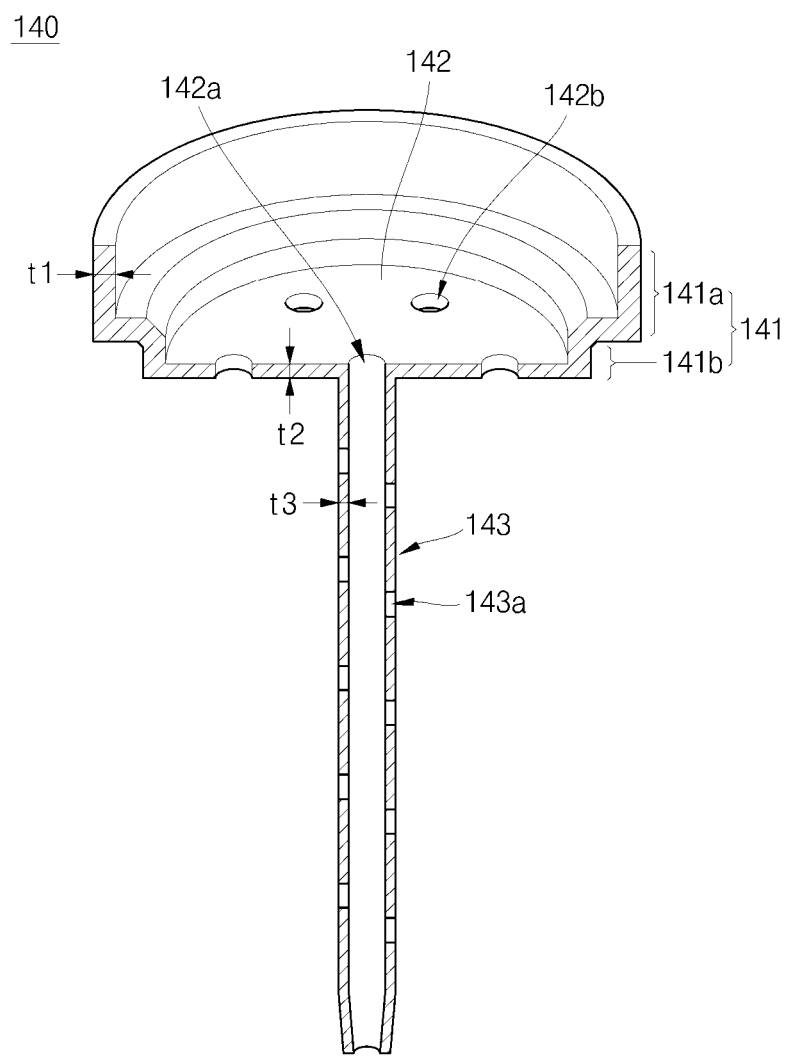
FIG. 5 is a perspective view illustrating the integrated assembly.
Figure 6:
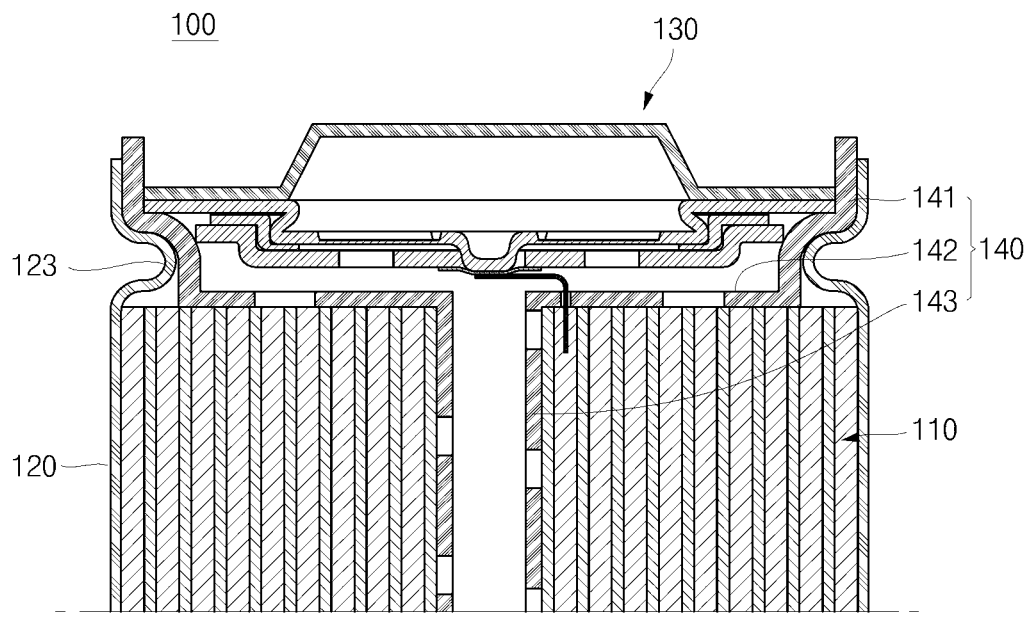
FIG. 6 is a sectional view illustrating the structure of the integrated assembly, before deformation.
Figure 7:
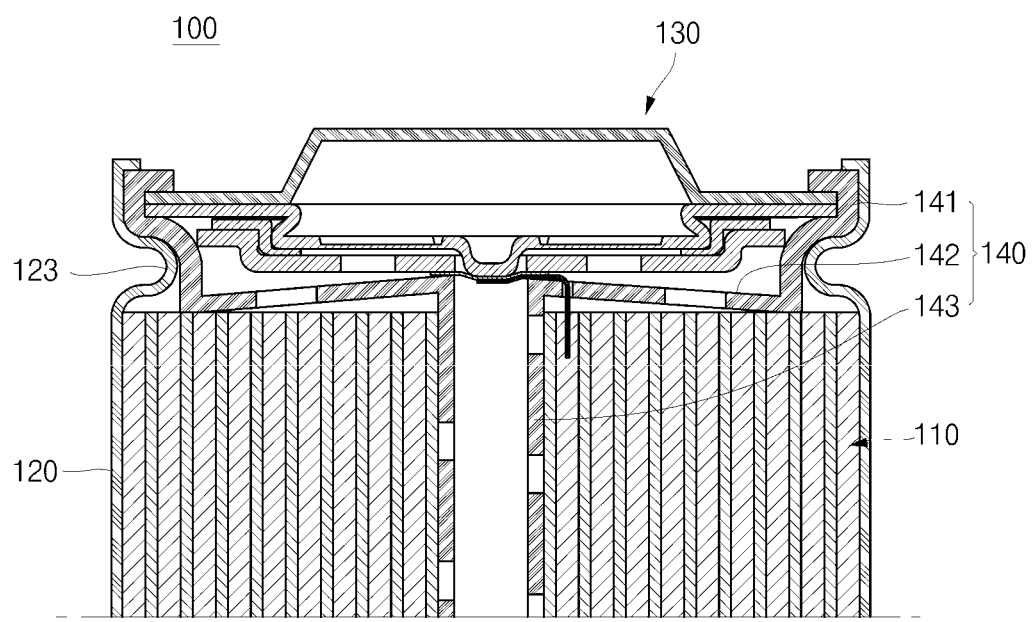
FIG. 7 is a sectional view illustrating the structure of the integrated assembly, after deformation.

FIG. 1 is an exploded perspective view illustrating a cylindrical secondary battery 100, according to an exemplary embodiment of the present invention, and FIG. 2 is a perspective view illustrating the cylindrical secondary battery 100, when assembled. FIG. 3 is a sectional view taken along 'A-A' line of FIG. 2, and FIG. 4 is a plan view illustrating an integrated assembly 140 of FIG. 4. FIG. 5 is a perspective view illustrating the integrated assembly 140. FIG. 6 is a sectional view illustrating the structure of the integrated assembly 140, before deformation, and FIG. 7 is a sectional view illustrating the structure of the integrated assembly 140, after deformation.

Referring to FIGS. 1 to 3, the cylindrical secondary battery 100 includes an electrode assembly 110, a can 120 to house the electrode assembly 110, a cap assembly 130 to seal an upper opening of the can 120, and the integrated assembly 140 to fix and support the electrode assembly 110, the can 120, and the cap assembly 130.

The electrode assembly 110 includes a cathode plate 111, an anode plate 112, and a separator 113 interposed therebetween. The electrode assembly 110 is formed by winding the cathode plate 111, anode plate 112, and separator 113 into a jellyroll-type shape.

The cathode plate 111 includes a cathode collector made of a thin aluminum foil, and a cathode active material layer containing lithium oxide, which is coated on both surfaces of the cathode collector. Cathode non-coating portions are formed on both ends of the cathode collector, where the cathode active material layer is not coated. A cathode tab 114 is fixed to one of the cathode non-coating portions, and projects through the cathode plate 111.

The anode plate 112 includes an anode collector made of a thin copper (Cu) foil, and an anode active material layer containing a carbonaceous material, which is coated on both surfaces of the anode collector. Anode non-coating portions are formed on both ends of the anode collector, where the anode active material layer is not coated. An anode tab 115 is fixed to the one of the anode non-coating portions, and is connected to a lower plate 122 of the can 120. The cathode and anode tabs 114 and 115 may be made of aluminum (Al), copper (Cu), or nickel (Ni). Usually, the cathode tab 114 is made of aluminum, and the anode tab 115 is made of nickel.

The separator 113 prevents a short between the cathode and anode plates 111 and 112, and permits lithium ions to pass there through. The separator 113 can be made of polyethylene, or polypropylene, but not limited thereto.

The can 120 includes a cylindrical side plate 121 to receive the electrode assembly 110, and a lower plate 122 to seal a lower end of the side plate 121. The can 120 may be made of a conductive metal, such as stainless steel. An opening at the upper part of the can 120 is sealed, after the electrode assembly 110 is inserted. A beading part 123 is formed at an upper side wall of the can 120, to support the cap assembly 130. The beading part 123 is a concave inwardly bent portion of the can 120.

A crimping part 124 is formed at the top of the can 120. The crimping part 124 is bent, so as to press against the integrated assembly 140. A lower insulation plate 116 is inserted into, the can 120, to insulate the electrode assembly 110 from the can 120. The lower insulation plate 116 may further include a hole. The anode tab 115 passes through the hole, and is electrically coupled to the can 120. Thus, the can 120 is electrically coupled to the anode tab 115, and is an electrode terminal.

The cap assembly 130 includes a cap up 131, a safety vent 132 disposed below the cap up 131, a cap down 134 disposed below the safety vent 132, an insulator 133 disposed between the safety vent 132 and cap down 134, and a sub-plate 135 disposed below the cap down 134. The cap assembly 130 may further include a ring-type secondary protection device (not shown), such as a PTC (positive temperature coefficient) device, between the cap up 131 and safety vent 132.

The cap up 131 is a circular plate having a projection part 131a that extends from the middle thereof. The cap up 131 is a electrical terminal. A plurality of holes 131b are defined in a side wall of the projection part 131a, to discharge gas generated inside the cylindrical secondary battery 100. The cap up 131 may be made of a metal, such as stainless steel.

The safety vent 132 is a circular plate, and is combined to an inward facing surface of the cap up 131. A lower projection part 132a is formed in the middle of the safety vent 132. The safety vent 132 may be made of a conductive material. The lower projection part 132a can further include a middle groove (not shown), and a cross groove (not shown) formed around the middle groove, as a reference point. The lower projection part 132a of the safety vent 132 is bent outward, when an internal pressure of the can 120 is increased above a threshold value. Peripheral parts of the middle and cross grooves are broken, when the safety vent 132 is bent. Accordingly, the safety vent 132 is electrically disconnected from the sub-plate 135. Thus, a current flow there through is interrupted. In addition, the gas inside the can 120 is exhausted to the outside, through a region that is opened by break of the lower projection part 132a. That is, the safety vent 132 prevents an explosion of the cylindrical secondary battery 100, which can be caused by internal gas pressure.

The cap down 134 is a circular plate and is combined to an inner portion of the safety vent 132. A through-hole 134a is formed in the middle of the cap down 134. The lower projection part 132a of the safety vent 132 extends through the through-hole 134a, and is exposed to the inner surface of the cap assembly 130. A plurality of openings 134b are formed around the through-hole 134a of the cap down 134. The openings 134b function to discharge gas generated in the electrode assembly 110.

The insulator 133 is provided between the safety vent 132 and the cap down 134. The insulator 133 insulates the safety vent from the cap down 134.

The sub-plate 135 is welded to block the through-hole 134a, and to be fixed to the lower projection part 132a. An inner surface of the sub-plate 135 is attached to the cathode tab 114. Accordingly, the sub-plate 135 is electrically coupled to the cathode tab 114. The sub-plate 135 is generally made of a metal, in order to electrically couple the safety vent 132 and cathode tab 114. The safety vent 132 and sub-plate 135 are welded to each other, and the cap down 134 and sub-plate 135 are welded to each other. In other words, the safety vent 132, the insulator 133, the cap down 134, and the sub-plate 135 are integrally combined, to form current interrupt device (CID).

Referring to FIGS. 4 and 5, the integrated assembly 140 includes a gasket 141, an insulation plate 142, and a central pin 143, which are all portions of the integrated assembly 140. In other words, the components of the integrated assembly 140 are contiguously formed, such that the integrated assembly is a single unit. Herein, contiguously formed refers to being formed so as to be connected throughout, in an unbroken sequence. An outer part of the gasket 141 is combined with the can 120, and an inner part of the gasket 141 surrounds the cap assembly 130. The insulation plate 142 extends from an inward facing surface of the gasket 141, and covers an outward facing surface of the electrode assembly 110. The central pin 143 extends from the center of the insulation plate 142, and is inserted into the center of the electrode assembly 110.

The gasket 141 includes a bent part 141a to seat and support the cap assembly 130, and a connection part 141b that extends from an inner surface of the bent part 141a, and is bent away from the cap assembly 130. When the upper part of the can 120 is bent, to form a crimping part 124 and a beading part 123, the bent part 141a is bent. Thus, the bent part 141a is bent around an outer surface of the cap assembly 130.

The outer edge of the cap up 131 is located inside of the bent part 141a, and the outer edge of the safety vent 132 is also located inside the bent part 141a. The outer edge of the cap down 134 is also located inside the connection part 141b.

The gasket 141 prevents an electrolyte from leaking out of the cylindrical secondary battery 100. The cap assembly 130 is secured by the bent part 141a of the gasket 141, to seal the can 120.

The insulation plate 142 is a circular plate that contacts the connection part 141b of the gasket 141. A main hole 142a is formed in the insulation plate 142. A plurality of sub-holes 142b are formed around the main hole 142a, to allow the electrolyte to be smoothly injected into the electrode assembly 110. The cathode tab 114 can extend through any one of the sub-holes 142b. The insulation plate 142 is located on the electrode assembly 110, to prevent a short between the electrode assembly 110 and cap assembly 130, and is similar to the lower insulation plate 116.

The central pin 143 extends from the main hole 142a of the insulation plate 142, and is hollow and cylindrical. A plurality of side wall holes 143a are formed in the central pin 143. The side wall holes 143a allow gas to escape from the electrode assembly 110, into the central pin 142. The gas can then escape from the central pin 142, via the sub-hole 142b of the insulation plate 142. The central pin 143 is inserted into the center of the electrode assembly 110, to prevent deformation of the electrode assembly 110, and to discharge gas therefrom, toward the cap assembly 130.

Thicknesses (t1, t2 and t3) of the gasket 141, the insulation plate 142, and the central pin 143 may be different from each other. The gasket 141 is generally thicker, because it is directly connected to the can 120, to seat/fix the cap assembly 130.

As described above, the integrated assembly 140 includes the gasket 141, insulation plate 142, and central pin 143, as an integrated unit. The integrated assembly 140 is formed of a resin, such as plastic, or polypropylene, and can be formed by injection molding.

The integrated assembly 140 can take the place of a conventional gasket, upper insulation plate, and central pin. Thus, by using the integrated assembly 140, the cylindrical secondary battery 100, can be more simply and economically manufactured, in comparison to a conventional cylindrical secondary battery, in which the gasket, upper insulation plate and center pin (not shown) are independently made and assembled. In addition, it is possible to weld the anode tab 115 and can 120 selectively, depending on work conditions, before and/or after combining the electrode assembly 110 and integrated assembly 140, in comparison to the conventional process, in which an anode tab and a can are welded after the center pin is combined to the electrode assembly. Thus, workability can be improved in manufacturing the cylindrical secondary battery 100.

The integrated assembly 140 is deformed when the upper part of the can 120 is bent to form the crimping part 124, thereby preventing up/down movements of the electrode assembly 110. The deformation of the integrated assembly 140 will be explained in detail below.

FIG. 6 shows the shape of the integrated assembly 140 before deformation, and FIG. 7 shows the shape of the integrated assembly 140 after deformation. Referring to FIG. 6, the cap assembly 130 and the insulation plate 142 are evenly spaced apart, before the integrated assembly 140 is deformed. In this state, when the bent part 141a of the gasket 141 is pressed away from the electrode assembly 110, the central pin 143 is pressed against the sub-plate 135, and the insulation plate 142 of the integrated assembly 140 is more firmly pressed against the electrode assembly. The insulation plate 142 is bent from the connection part 141b of the gasket 141.

It is desirable to allow the central pin 143 to move into contact with the sub-plate 135, such that the length of the bent part 141a of the gasket unit 141 is vertically compressed, by more than about 40%, or about 50%. The compression is performed during the formation of the crimping part 124. When the length of the bent part 141a is compressed by less than about 40%, the up/down movements of the electrode assembly 110 may not be effectively prevented, because the bent part 141a does not contact the sub-plate 135, even though it is possible to move the central pin 143. When the length of the bent part 141a is reduced by more than 50%, the central pin 143 may excessively press against the sub-plate 135, thereby disrupting the operation of the current interrupt device.

When the integrated assembly 140 is deformed to support the cap assembly 130 and the electrode assembly 110, it is possible to secure the electrode assembly 110, and to prevent the internal resistance (IR) thereof, from being increased, by movements of the electrode assembly 110. In addition, the outer edge of the cap assembly 130 is fixed by the gasket 141, and the cap assembly 130 is also supported by the central pin 143. Thus, the cap assembly 130 can be stably supported.

When the cylindrical secondary battery 100 is used as a power source of an electric tool, the electrode assembly 110 can be more effectively secured from vibrations generated by the tool.

As described above, the cylindrical secondary battery 100 has the following advantages. First, an increase of internal resistance can be prevented, by effectively preventing movements of the electrode assembly. Second, the movements of the electrode assembly can be more effectively prevented, in the case of vibrations from an electric tool. Third, manufacturing costs and operations can be reduced, in comparison to the case where a gasket, an upper insulation plate, and a central pin are independently made and assembled.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

What is claimed is:

1. A cylindrical secondary battery, comprising:
    a jellyroll-shaped electrode assembly, comprising first and second electrode plates, a separator disposed therebetween, and first and second electrode tabs respectively extending from the first and second electrode plates;
    a can configured to house the electrode assembly;
    a cap assembly, affixed to the can, and configured to seal an opening of the can, wherein the electrode assembly has a top surface facing the cap assembly; and
    an integrated assembly comprising a gasket, an insulation plate extending from the gasket, and a central pin extending from the insulation plate, into a central portion of the electrode assembly, wherein the integrated assembly is formed as a single unit, such that the gasket, the insulation plate, and the central pin are integral and contiguous portions of the integrated assembly, and
    wherein the can is crimped against the integrated assembly, such that the gasket is bent to secure the cap assembly, and the insulation plate is pressed against an end of the electrode assembly,
    wherein the insulation plate is inclined with respect to the top surface of the electrode assembly,
    wherein one end of the insulation plate contacts the electrode assembly and another end of the insulation plate contacts the cap assembly,
    wherein the insulation plate comprises a top surface facing the cap assembly,
    wherein a portion of the top surface of the insulation plate contacts the cap assembly, and
    wherein the remaining portion of the top surface of the insulation plate is spaced apart from the cap assembly.

2. The cylindrical secondary battery of claim 1, wherein the central pin supports the cap assembly, when the integrated gasket is pressed.

3. The cylindrical secondary battery of claim 1, wherein the gasket has a bent part that is bent around the cap assembly, such that the length of the bent part, with respect to a long axis of the secondary battery, is reduced by about 40% to 50%.

4. The cylindrical secondary battery of claim 1, wherein the gasket has:
    a bent part that is bent around an outer edge of the cap assembly, such that the bent part contacts a surface of the cap assembly that faces away from the electrode assembly; and
    a connection part that extends from the bent part, and is bent away from the cap assembly, so as to support a surface of the cap assembly that faces the electrode assembly.

5. The cylindrical secondary battery of claim 1, wherein the insulation plate is circular, has a main hole that is connected to the central pin, and has sub-holes formed around the main hole,
    wherein the first electrode tab passes one of the sub-holes.

6. The cylindrical secondary battery of claim 1, wherein the central pin is hollow, and has holes defined therein that face the electrode assembly.

7. The cylindrical secondary battery of claim 1, wherein the gasket is thicker than the insulation plate and the central pin.

8. The cylindrical secondary battery of claim 1, wherein the integrated assembly is formed of a plastic, or a polypropylene.

9. The cylindrical secondary battery of claim 1, wherein the integrated assembly is formed by injection molding.

10. The cylindrical secondary battery of claim 4, wherein the cap assembly comprises:
    a cap up;
    a safety vent disposed on the cap up;
    an insulator disposed on the safety vent;
    a cap down disposed on the insulator; and
    a sub-plate disposed on the cap down.

11. The cylindrical secondary battery of claim 10, wherein the cap up is a circular plate having a central portion that projects away from the electrode assembly, and having an outer edge that is disposed inside of the bent part.

12. The cylindrical secondary battery of claim 10, wherein the safety vent is a circular plate having a middle portion that projects toward the electrode assembly, and having an outer edge that is disposed inside the bent part.

13. The cylindrical secondary battery of claim 10, wherein the cap down is a circular plate having a through-hole through which a middle portion of the safety vent projects, and having an outer edge disposed inside of the connection part.

14. A cylindrical secondary battery, comprising:
    an electrode assembly;
    a can configured to house the electrode assembly;
    a cap assembly, affixed to the can, and configured to seal an opening of the can, wherein the electrode assembly has a top surface facing the cap assembly; and
    an integrated assembly comprising a gasket, an insulation plate extending from the gasket, and a central pin extending from the insulation plate, into a central portion of the electrode assembly, wherein,
    the can is crimped against the integrated assembly, such that the gasket is bent around the cap assembly, the insulation plate is pressed against, and is inclined with respect to, the top surface of the electrode assembly, and the central pin is pressed against the cap assembly,
    the integrated assembly is formed as a single unit wherein the gasket, the insulation plate, and the central pin are integral portions of the integrated assembly, and
    one end of the insulation plate contacts the electrode assembly and another end of the insulation plate contacts the cap assembly,
    the insulation plate comprises a top surface facing the cap assembly,
    a portion of the top surface of the insulation plate contacts the cap assembly, and
    the remaining portion of the top surface of the insulation plate is spaced apart from the cap assembly.

15. The cylindrical secondary battery of claim 14, wherein the gasket has:
    a bent portion that is bent around the an outer edge of cap assembly, by the can; and
    a connection part that extends from the bent part, which is bent away from the cap assembly, around a beading part of the can, and which supports a surface of the cap assembly that faces the electrode assembly.

16. The cylindrical secondary battery of claim 14, wherein the integrated assembly is formed of a thermoplastic resin.

17. The cylindrical secondary battery of claim 1, wherein the insulation plate comprises a bottom surface facing the top surface of the electrode assembly, wherein a portion of the bottom surface of the insulation plate contacts the top surface of the electrode assembly, and wherein the remaining portion of the bottom surface of the insulation plate is spaced apart from the top surface of the electrode assembly.

18. The cylindrical secondary battery of claim 14, wherein the insulation plate comprises a bottom surface facing the top surface of the electrode assembly, wherein a portion of the bottom surface of the insulation plate contacts the top surface of the electrode assembly, and wherein the remaining portion of the bottom surface of the insulation plate is spaced apart from the top surface of the electrode assembly.

* * * * *